(12) United States Patent
Klausner et al.

(10) Patent No.: US 10,266,420 B2
(45) Date of Patent: Apr. 23, 2019

(54) METHOD FOR THE GENERATION OF POWER

(71) Applicant: University of Florida Research Foundation, Inc., Gainesville, FL (US)

(72) Inventors: James Klausner, Gainesville, FL (US); Kelvin Fnu Randhir, Gainesville, FL (US); Nicholas AuYueng, Corvallis, OR (US); Like Li, Gainesville, FL (US); Nathan Rhodes, Gainesville, FL (US); Amey Anand Barde, Gainesville, FL (US); Renwei Mei, Gainesville, FL (US); David Worthington Hahn, Gainesville, FL (US)

(73) Assignee: UNIVERSITY OF FLORIDA RESEARCH FOUNDATION, INC, Gainesville, FL (US)

( * ) Notice: Subject to any disclaimer, the term of this patent is extended or adjusted under 35 U.S.C. 154(b) by 25 days.

(21) Appl. No.: 15/317,265

(22) PCT Filed: Apr. 20, 2016

(86) PCT No.: PCT/US2016/028345
§ 371 (c)(1),
(2) Date: Dec. 8, 2016

(87) PCT Pub. No.: WO2016/172144
PCT Pub. Date: Oct. 27, 2016

(65) Prior Publication Data

US 2018/0037466 A1 Feb. 8, 2018

Related U.S. Application Data

(60) Provisional application No. 62/151,486, filed on Apr. 23, 2015.

(51) Int. Cl.
*F03G 6/00* (2006.01)
*C01F 11/06* (2006.01)
(Continued)

(52) U.S. Cl.
CPC .............. *C01F 11/06* (2013.01); *C01B 15/04* (2013.01); *C01F 11/187* (2013.01); *F03G 6/003* (2013.01);
(Continued)

(58) Field of Classification Search
CPC ......... C01F 11/06; C01F 11/187; C01B 15/04
(Continued)

(56) References Cited

U.S. PATENT DOCUMENTS 3,713,051 A 1/1973 Kell
6,440,575 B1 8/2002 Heimberg et al.
(Continued)

FOREIGN PATENT DOCUMENTS

DE 19801424 B4 8/2004
DE 102010009543 A1 9/2011
WO 2012130285 A1 10/2012

OTHER PUBLICATIONS

Belik; "Preparation of High-Refractory Products Made of Strontium Zirconate and Strontium Hafnate"; Ukrainian Scientific-Research Institute of Refractories; No. 11; 1969, pp. 707-709.
(Continued)

Primary Examiner — Jason Shanske
(74) Attorney, Agent, or Firm — Thomas | Horstemeyer, LLP

(57) ABSTRACT

Disclosed herein is a method comprising heating a strontium-containing compound using radiation in a first reactor; decomposing the strontium-containing compound into an oxide and carbon dioxide as a result of heat generated by the exposure to the radiation; reacting the oxide and the carbon
(Continued)

dioxide in a second reactor; where the oxide and carbon dioxide react to produce heat; heating a working fluid using the heat produced in the second reactor; and driving a turbine with the heated working fluid to generate energy. Disclosed herein too is a composition comprising strontium carbonate; and strontium zirconate; where the mass ratio of strontium carbonate to strontium zirconate 2:8 to 8:2.

16 Claims, 13 Drawing Sheets

(51) Int. Cl.
*C01F 11/18* (2006.01)
*C01B 15/04* (2006.01)
*F03G 6/06* (2006.01)
*F28F 13/18* (2006.01)
*C01B 32/50* (2017.01)

(52) U.S. Cl.
CPC ............... *F03G 6/06* (2013.01); *F28F 13/18* (2013.01); *C01B 32/50* (2017.08); *Y02E 10/46* (2013.01); *Y02P 20/129* (2015.11); *Y02P 20/134* (2015.11)

(58) Field of Classification Search
USPC ....................................................... 60/641.15
See application file for complete search history.

(56) References Cited

U.S. PATENT DOCUMENTS

| | | | |
|---|---|---|---|
| 6,887,588 | B2 | 5/2005 | Ackerman et al. |
| 6,911,231 | B2 | 6/2005 | Qu |
| 2008/0083444 | A1 | 4/2008 | Beretich |
| 2009/0071155 | A1 | 3/2009 | Boyapati et al. |
| 2012/0216981 | A1 | 8/2012 | Bank et al. |
| 2013/0178677 | A1 | 7/2013 | Schmid et al. |
| 2014/0346034 | A1 | 11/2014 | Klausner |
| 2016/0122670 | A1 | 5/2016 | Klausner et al. |
| 2018/0093931 | A1* | 4/2018 | Schammel ............... B01J 23/34 |

OTHER PUBLICATIONS

Chun et al.; "Degradation of zirconate materials in ultra-high temperature reverse-flow pyrolysis reactors"; J Mater Sci, 48; 2013, pp. 3975-3984.
Dunn et al.; "A Review of Ammonia-Based Thermochemical Energy Storage for Concentrating Solar Power"; Proceedings of the IEEE; vol. 100, No. 2; 2012, pp. 391-400.
Ervin, "Solar Heat Storage Using Chemical Reactions"; Journal of Solid State Chemistry; vol. 22, No. 1; 1977, pp. 51-61.
Go et al.; "Reaction kinetics of reduction and oxidation of metal oxides for hydrogen production"; International Journal of Hydrogen Energy, vol. 33; 2008, 5986-5995.
International Search Report for International Application No. PCT/US2016/028345, International Filing Date Apr. 20, 2016, dated Jul. 21, 2016, 7 pages.
Klausner et al.;U.S. Appl. No. 61/833,525, entitled "Solar Thermochemical Reactor and Methods of Manufacture and Use Thereof", filed Jun. 11, 2013.
Lovegrove et al.; "Developing ammonia based thermochemical energy storage for dish power plants"; Solar Energy; vol. 76; 2004, pp. 331-337.
Mehdizadeh et al.; "Enhancement of thermochemical hydrogen production using an iron-silica magnetically stabilized porous structure"; International Journal of Hydrogen Energy, vol. 37, 2012; pp. 8954-8963.
Nguyen; "System analysis of chemical and carbonate looping processes in IGCC power plants for CO2 separation"; Master's Thesis w/in the Master's prog. Sustainable Energy Systems, Dept. of Energy&Environment, Chalmers U. of Tech., Goteborg,Sweden;2011,7 pages.
Shende et al.; "Strontium Zirconate and Strontium Titanate Ceramics for High-Voltage Applications: Synthesis, Processing, and Dielectric Properties"; J. Am. Ceram. Soc; 84(7); 2001, pp. 1648-1650.
Slonimskaya et al.; "Ceramics Based on Strontium Zirconate"; Glass and Ceramics, vol. 58, Nos. 1-2; 2001, 3 pages.
Takenaka et al.; "Sequential production of H2 and CO over supported Ni catalysts"; Fuel, vol. 83; 2004, pp. 47-57.
Written Opinion for International Application No. PCT/US2016/028345, International Filing Date Apr. 20, 2016, dated Jul. 21, 2016, 7 pages.
Zborowska et al.; "The Preparation and Properties of Strontium Zirconate Ceramics for Channels of Open-Cycle MHD Generators"; Ceramurgia International, vol. 6, No. 3; 1983, 5 pages.
Zhao et al.; "A Novel calcium looping absorbent incorporated with polymorphic spacers for hydrogen production and CO2 capture"; Energy Environ. Sci.; vol. 7; 2014, pp. 3291-3295.

* cited by examiner

US 10,266,420 B2

METHOD FOR THE GENERATION OF POWER

CROSS REFERENCE TO RELATED APPLICATIONS

This application is a National Stage application of PCT/US2016/028345, filed Apr. 20, 2016, which claims the benefit of U.S. Provisional Application No. 62/151,486, filed Apr. 23, 2015, both of which are incorporated by reference in their entirety herein.

STATEMENT REGARDING FEDERALLY SPONSORED RESEARCH

This invention was made with Government support under Contract/Grant Number DE-EE00006534 awarded by the Department of Energy. The government has rights in the invention.

BACKGROUND

This disclosure relates to a solar reactor for the generation of power. In particular, this disclosure relates to a solar reactor for the generation of power during both day and night.

In recent years, thermochemical processes have been gaining a significant importance for synthesis of fuels (hydrogen, Syngas) and energy storage. There exist a range of looping processes based on metal oxides, hydrides, hydrates, sulfates and carbonates that are being investigated for this application. Typically, these processes are operated at higher temperature for maximum yield/energy output and better efficiency. However, higher operating temperature poses a major challenge that includes the sintering of the reactive particles that causes the loss of the chemically active surface area and adversely affects the performance of the looping process. Researchers have attempted various techniques to inhibit sintering, of which the addition of stable secondary particles is a robust approach. Various materials including alumina, zirconia, silica, are commonly used additives to inhibit sintering. These materials all have some drawbacks. It is therefore desirable to produce new materials that resist sintering upon being exposed to elevated temperatures.

SUMMARY

Disclosed herein is a method comprising heating a strontium-containing compound using radiation in a first reactor; decomposing the strontium-containing compound into an oxide and carbon dioxide as a result of heat generated by the exposure to the radiation; reacting the oxide and the carbon dioxide in a second reactor; where the oxide and carbon dioxide react to produce heat; heating a working fluid using the heat produced in the second reactor; and driving a turbine with the heated working fluid to generate energy.

Disclosed herein too is a composition comprising strontium carbonate; and strontium zirconate; where the mass ratio of strontium carbonate to strontium zirconate varies from 2:8 to 8:2.

Disclosed herein too is a system comprising a first reactor in fluid communication with a second reactor; where the first reactor contains a strontium-containing compound; and wherein the system is operative to heat the strontium-containing compound using radiation or waste heat in the first reactor; decompose the strontium-containing compound into an oxide and carbon dioxide as a result of heat generated by the exposure to the radiation or the waste heat; react the oxide and the carbon dioxide in the second reactor; where the oxide and carbon dioxide react to produce heat; heat a working fluid using the heat produced in the second reactor; and drive an energy generator with the heated working fluid to generate energy. The system is in fluid communication with a sorbent chamber (not shown) that stores the carbon dioxide generated in the first reactor.

DETAILED DESCRIPTION

Figure 1:
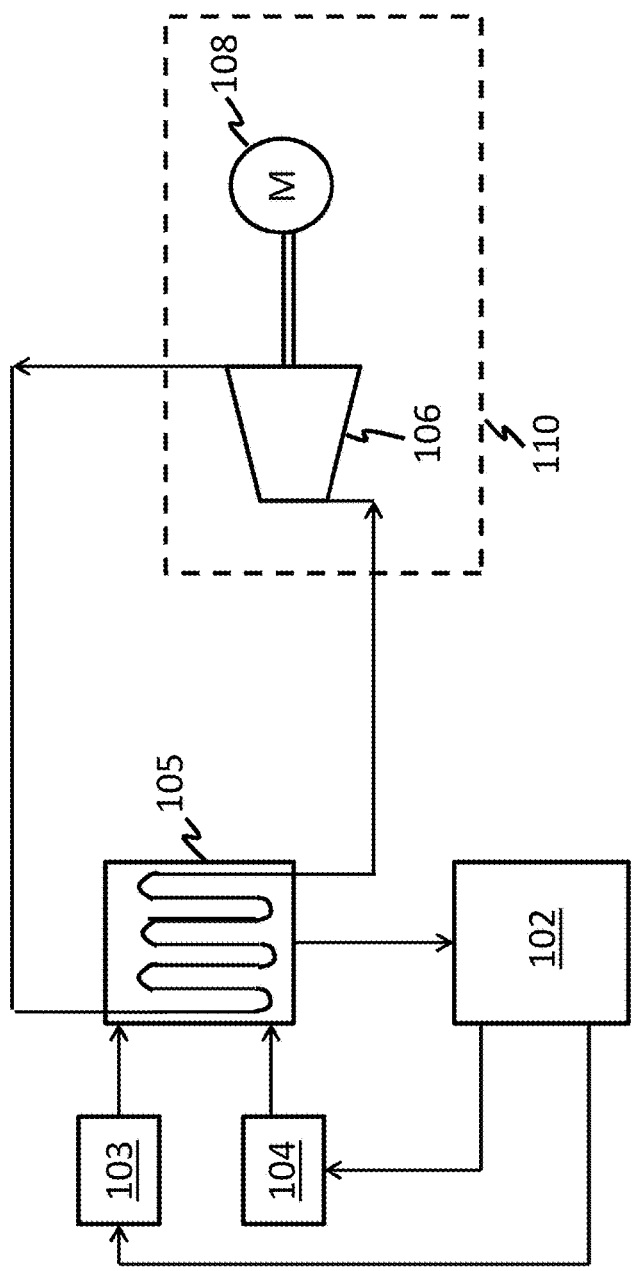
FIG. 1 is a schematic diagram of the set-up for generating energy using strontium carbonate.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," "upper" or "top," and "inner" or "outer" may be used herein to describe one element's relationship to another element as illustrated in the Figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower," can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, the term "hydraulic diameter" shall refer to the hydraulic diameter of an object or portion of an object of any shape, including but not limited to, circular and non-circular and cylindrical and non-cylindrical shapes.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The transition term "comprising" encompasses the transition terms "consisting of" and "consisting essentially of."

Various numerical ranges are disclosed herein. These ranges are inclusive of the endpoints as well as numerical values between these endpoints. The numbers in these ranges and those on the endpoints are interchangeable.

Disclosed herein are compositions that can be used in solar cells to absorb solar energy when it is available and to release some of this energy when solar energy is no longer available. In an embodiment, the solar energy is absorbed by the composition during the day and is released by the composition via an exotherm during the night. The composition does not undergo sintering and hence is reusable. The composition comprises strontium carbonate and the process makes use of the carbonation of strontium oxide to release energy that can be used for energy generation when there is no solar energy. The decarbonation of strontium carbonate is facilitated by absorption of solar energy or by the use of waste heat from another heat generating process. The reversible reaction is shown below.

Disclosed herein too is a system comprising a first reactor in fluid communication with a second reactor; where the first reactor contains a strontium-containing compound; and wherein the system is operative to heat the strontium-containing compound using radiation or waste heat in the first reactor; decompose the strontium-containing compound into an oxide and carbon dioxide as a result of heat generated by the exposure to the radiation or the waste heat; react the oxide and the carbon dioxide in the second reactor; where the oxide and carbon dioxide react to produce heat; heat a working fluid using the heat produced in the second reactor; and drive an energy generator with the heated working fluid to generate energy. The system is in fluid communication with a sorbent chamber (not shown) that stores the carbon dioxide.generated in the first reactor.

The technology is based on the cyclical carbonation/decarbonation of a $SrO/SrCO_3$ system.

$$SrCO_3 \leftrightarrow SrO + CO_2$$

This reversible reaction can be used for solar thermochemical energy storage. In an exemplary embodiment, there are no side reactions and catalysts may not be used for either the carbonation or decomposition steps. While catalysts do not have to be used for the aforementioned reaction, they may be used if desired. Similarly, other reactants may be used if desired to improve the extent of the carbonation or decarbonation reaction if desired.

The system is advantageous in that it can be used at temperatures of greater than 800° C., preferably greater than 900° C., preferably greater than 1100° C. and more preferably greater than 1150° C., without any degradation or sintering of the strontium carbonate.

The FIG. 1 depicts a system 100 for the use of the composition. The system 100 comprises a first reactor 102 in fluid communication with a second reactor 105. The second reactor 105 is in fluid communication with a first storage 103 and a second storage 104. The first reactor 102 is a solar reactor and uses solar energy to facilitate the decomposition of strontium carbonate into carbon dioxide and strontium oxide. The strontium oxide and carbon dioxide are separated from each other and discharged to the first storage chamber 103 and second storage chamber 104 respectively. Strontium oxide is stored in the first storage chamber 103 and carbon dioxide is stored in the second storage chamber 104. When energy for power generation is desired, the strontium oxide and the carbon dioxide are charged to the second reactor 105 where they react to produce strontium carbonate with the generation of heat since the reaction to generate strontium carbonate is an exothermic reaction.

The second reactor 105 is supplied with the strontium oxide from the first storage chamber 103 and the carbon dioxide from the second storage chamber 104 when energy in the form of electricity is desired. The second reactor 105 may also contain a heat exchanger or may be in fluid communication with a heat exchanger. A fluid (e.g., water) is charged to the coils in the second reactor 105. The water temperature is increased and the high temperature water, steam or steam-water mixture is transported to the turbine 106 where it contacts the blades of the turbine and rotates them. The rotary motion of the turbine 106 is transferred to the generator 108 to produce energy. The combination of the turbine 106 with the generator 108 is referred to as the power block 110. This mode of storing energy in chemical form and using it when desired is called thermochemical energy storage.

While the FIG. 1 depicts two single reactors, it is possible for the system to employ a single reactor where two stages are utilized. In the first stage, the strontium carbonate uses heat from radiation or waste heat to decompose to strontium oxide and carbon dioxide, while in the second stage, the strontium oxide is reacted with carbon dioxide to generate heat.

The working fluid may be water, air, carbon dioxide or supercritical carbon dioxide. The energy generator may be an ionic solid state device or a turbine in communication with a generator.

During the solar driven, endothermic step, $SrCO_3$ is decomposed, releasing $CO_2$ to storage. Given the high temperatures involved, the system will feature direct coupling of the solar receiver to the reactor 102, without a need for heat transfer fluid during the endothermic step. Exemplary solar reactors 102 are detailed in US Patent Publication No. 20140346034 A1 to Klausner et al. and Patent Publication No. PCT/US2014/041660 to Klausner et al. the entire contents of which are hereby incorporated by reference.

Figure 11:
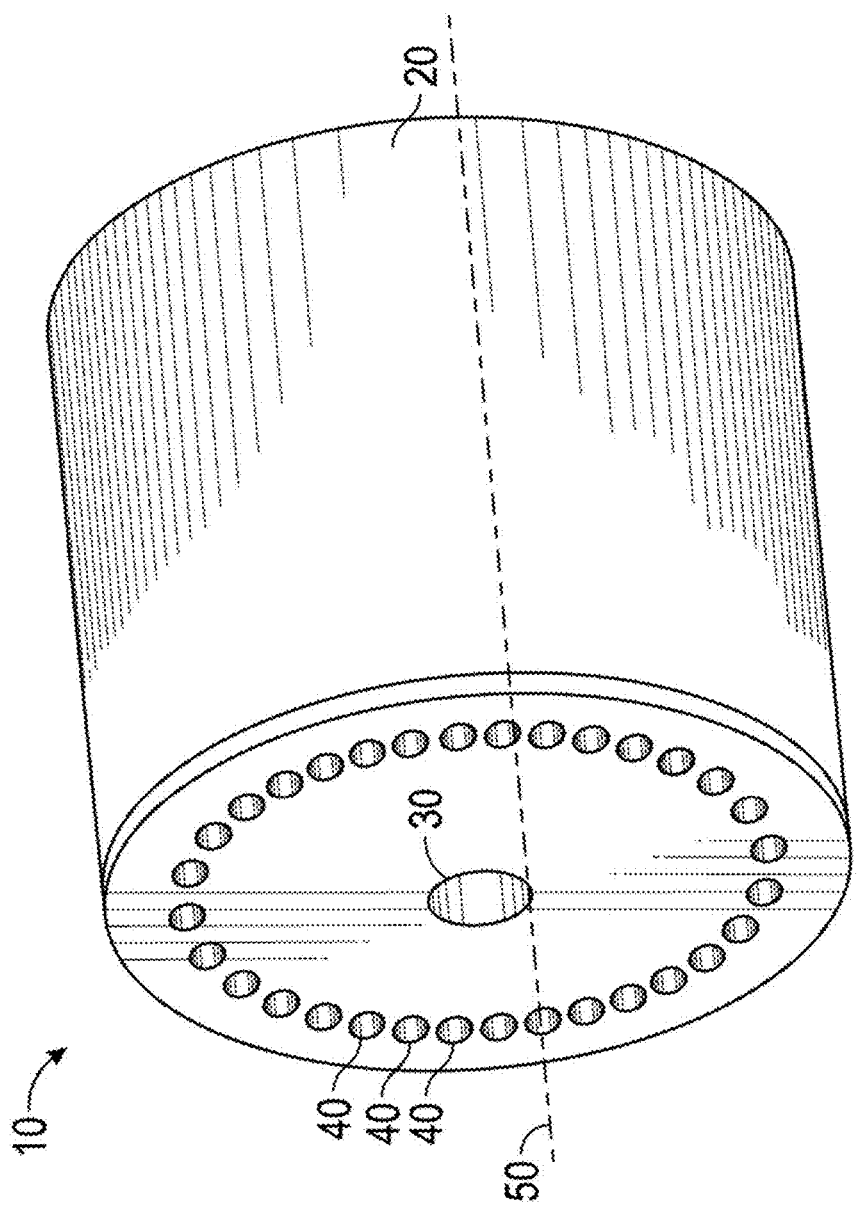
FIG. 11 is a depiction of a portion of the solar reactor.
Figure 12:
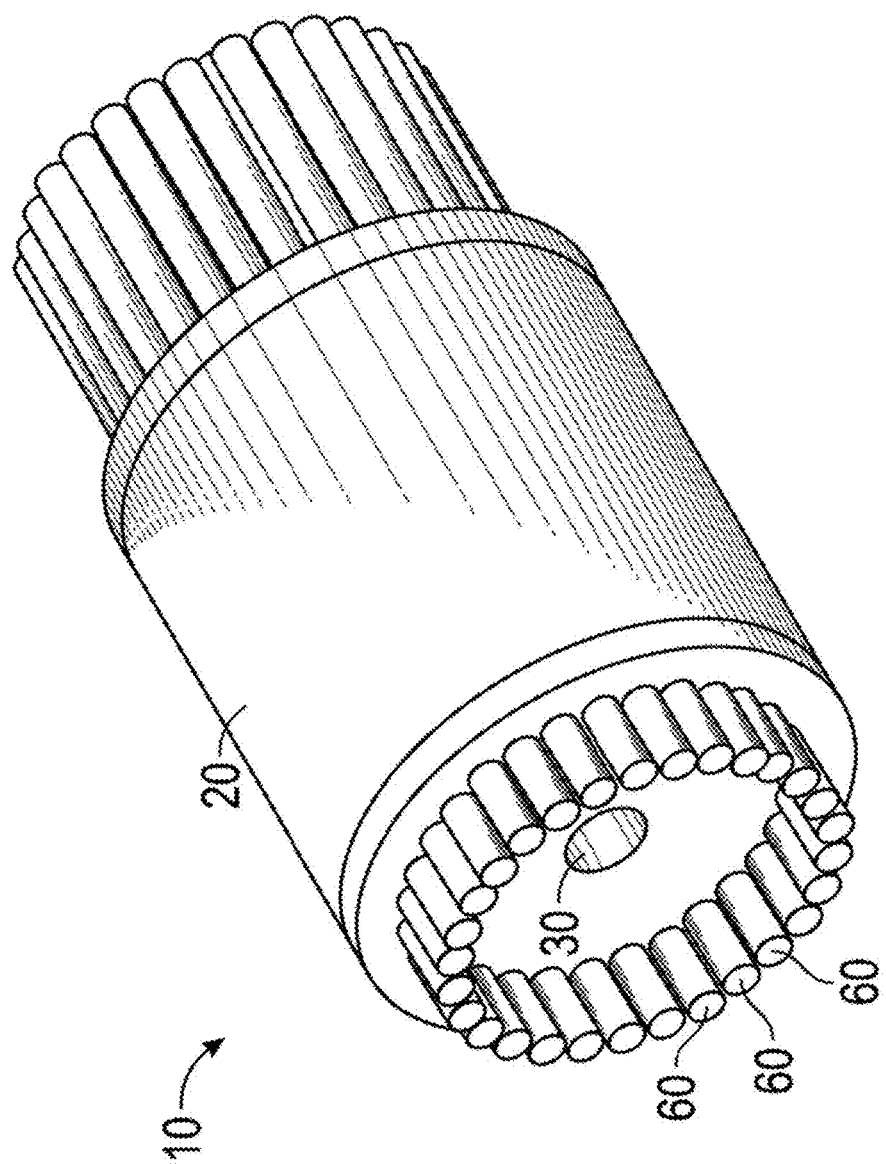
FIG. 12 is another exemplary depiction of another portion of the solar reactor.

In an exemplary embodiment, as depicted in FIGS. 11 and 12, the solar thermochemical reactor 10 comprises a reactor member 20, an aperture 30 for receiving solar radiation disposed with the reactor member 20 and a plurality of cavities 40 disposed with the reactor member 20. The aperture 30 is disposed in a plane on a wall of the reactor member, where the plane is oriented at any angle other than parallel relative to the centerline of the reactor member. As can be seen from the front and rear views in FIGS. 11 and 12, the plurality of cavities 40 extend (longitudinally) from one end of the reactor member 20 to the other end of the reactor member 20.

Figure 13:
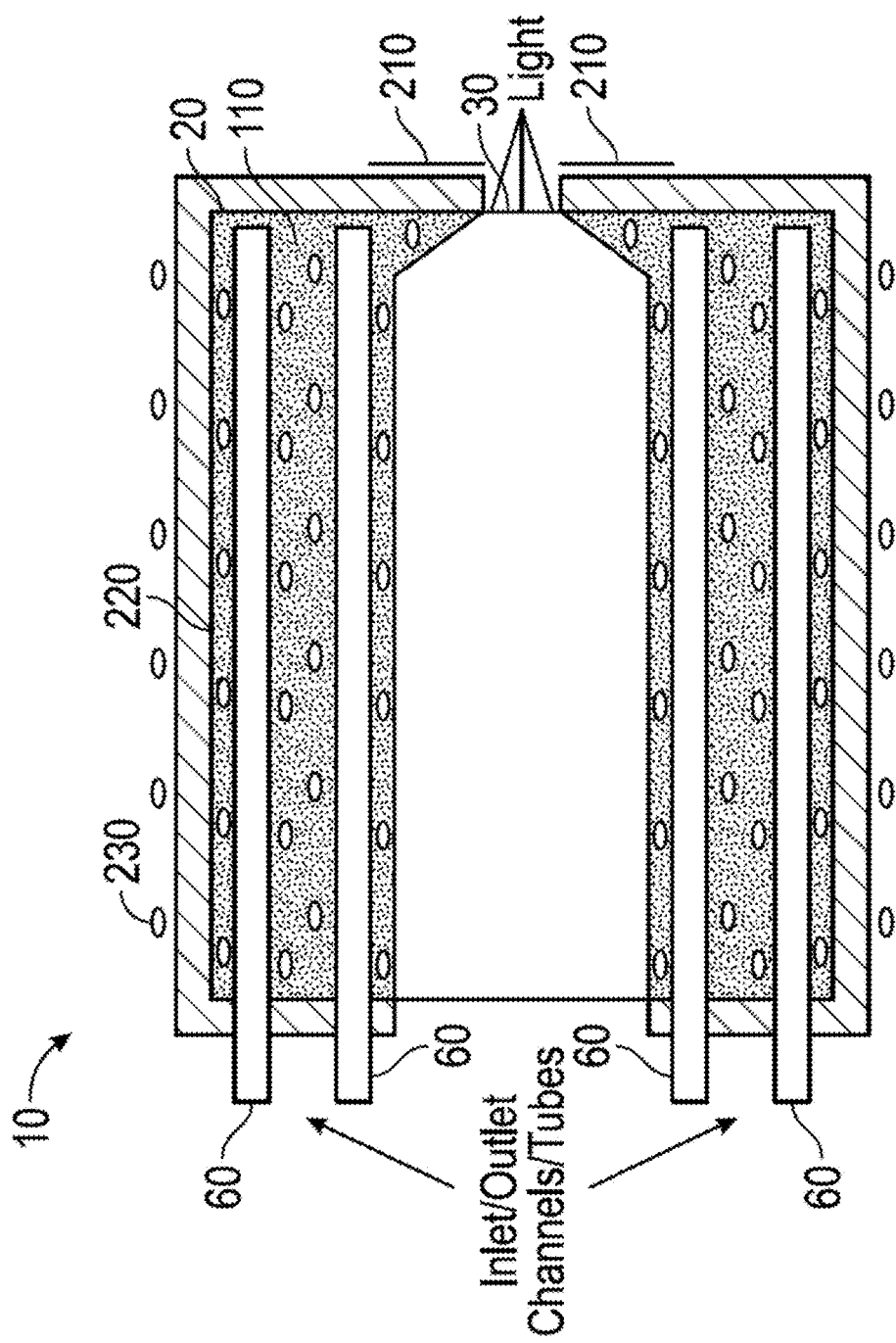
FIG. 13 is another exemplary depiction of another portion of the solar reactor.

As depicted in FIG. 13, the solar thermochemical reactor 10 further comprises a plurality of absorber tubes 60 disposed within the cavities 40 of the reactor member 20. The plurality of absorber tubes 60 are arranged concentrically, i.e., equidistant from the aperture 30, around the inner perimeter of the reactor member 20. A reactive material (not shown) is disposed in each of the absorber tubes in the plurality of absorber tubes 60. The absorber tubes in the plurality of absorber tubes 60 further comprise a material port at one open end of the absorber tube from which reaction products are extracted and reactant materials may be introduced. The reactor members 10 and the plurality of absorber tubes 60 of the reactor are of any shape known to those of skill in the art, specifically a cylindrical shape.

In an embodiment, the plurality of absorber tubes 60 are arranged concentrically, i.e., equidistant from the aperture 30, around the inner perimeter of the reactor member 20. In an exemplary embodiment, the position and arrangement of the plurality of absorber tubes 60 relative to the outer perimeter of the aperture 30 are selected to maximize the exposure of solar radiation to the reactive material disposed in the plurality of absorber tubes 60 and to minimize solar radiation or heat from traveling outside of the absorber tubes 60 within the reactor member 20. When absorber tubes in the plurality of absorber tubes 60 are positioned too close to the aperture 30, the reactor 10 may heat up too quickly and re-radiate heat out of the aperture 30. When the absorber tubes in the plurality of absorber tubes 60 are positioned too far away from the aperture 30, it may take too long to heat the reactor 10 and result in a greater surface area for the loss of convective heat. Accordingly, the position, or distance, of the absorber tubes 60 relative to the outer perimeter of the aperture 30 is selected to maximize the heat generated in and minimize the heat lost from the solar reactor 10 while affording control of the kinetics of the thermochemical reactions therein.

In an embodiment, the ratio of the distance from the outer perimeter of the aperture 30 to the inner edge of the outer perimeter of the absorber tubes in the plurality of absorber tubes 60 to the hydraulic diameter of the aperture 30 is 5:1. In another embodiment, the ratio of the distance from the outer perimeter of the aperture 30 to the outer perimeter of the absorber tubes in the plurality absorber tubes 60 to the hydraulic diameter of the aperture 30 is 3.5:1. In yet another embodiment, the ratio of the distance from the outer perimeter of the aperture 30 to the outer perimeter of the absorber tubes in the plurality of absorber tubes 60 to the hydraulic diameter of the aperture 30 is 2:1. In still another embodiment, the ratio of the distance from the outer perimeter of the aperture 30 to the outer perimeter of the absorber tubes in the plurality of absorber tubes 60 to the hydraulic diameter of the aperture 30 is 1:1.

Although the reactor and absorber tubes are illustrated in the figures as being generally cylindrical in shape, and although the term "tube" is used to describe that tubular portion of the reactor which is filled with the reactive material, it should be understood that the relative shapes of the reactor and absorber tubes are not so limited. The reactor and/or absorber tubes may be of any shape and may be similarly or differently shaped. Non-limiting examples of such shapes include cylindrical or tubular, cubic, and/or spherical.

As demonstrated in the cross-section of the reactor 10 depicted in FIG. 13, in an embodiment, the absorber tubes in plurality of absorber tubes 60 are disposed at different distances from the outer perimeter of the aperture 30. In one embodiment, the absorber tubes in the plurality of absorber tubes 60 are arranged concentrically from the aperture 30 such that there are no gaps or no significant gaps between adjacent absorber tubes, without the absorber tubes touching one another. In another embodiment, the absorber tubes in the plurality of absorber tubes 60 are arranged in two or more concentrically arranged circles around the inner perimeter of the reactor member 20. In still another embodiment, the absorber tubes in the plurality of absorber tubes 60 are arranged in two or more concentrically arranged circles around the inner perimeter of the reactor member 20 and are further arranged such that there are no gaps or no significant gaps between adjacent absorber tubes, without the absorber tubes touching one another. Positioning the absorber tubes in close proximity to one another reduces the thermal loss from the individual absorber tubes since heat must first travel through the absorber tubes containing the reactive material before exiting the reactor member 20.

In an embodiment, the aperture 30, the plurality of cavities 40, and the plurality of absorber tubes 60 are oriented at an angle of from 0° to less than 90° relative to the center line 50 of the reactor member 20. In another embodiment, the aperture 30, the plurality of cavities 40, and the plurality of absorber tubes 60 are oriented at an angle of from 0° to 45° relative to the center line 50 of the reactor member 20. In yet another embodiment, the aperture 30, the plurality of cavities 40, and the plurality of absorber tubes are horizontally (longitudinally) oriented relative to the center line 50 of the reactor member 20 such that they are substantially parallel or parallel to the center line 50 of the reactor member 20.

The aperture 30 for receiving solar radiation allows solar radiation in, and the radiation is trapped within the reactor member 20 and eventually absorbed by the walls of the plurality of cavities 40 in the reactor member 20 and the plurality of absorber tubes 60. The reactive material 110 ($SrCO_3$) is disposed within the reactor member 20. Visible and infrared radiation are useful for heating the strontium carbonate.

The reactor member 20 further comprises a shutter 210 which exposes or covers the aperture 30 in the reactor member 20 for receiving solar radiation as desired. The shutter 210 can be seen in FIG. 13. The shutter 210 is optionally attached to the reactor member 20. In one embodiment, the shutter 210 has its own support and activation mechanism (not shown). When the shutter 210 is open, solar radiation is permitted to enter into the aperture 30 and the reactor 10, thereby producing heat. When the shutter 210 is closed, solar radiation is prevented from entering the reactor 10, and the heat inside the reactor is conserved while re-radiation is prevented. The use of the shutter 210 in open and closed modes promotes the efficiency of the thermochemical reactions carried out in the reactor 10. No external heating is used to carry out the thermochemical reactions in the reactor 10. In an embodiment, the solar radiation which the aperture 30 receives is in the form of concentrated radiation.

In an embodiment, as depicted in a cross section of the reactor assembly shown in FIG. 13, the reactor member 20 of the reactor 10 further comprises an insulating material 220. The insulating material 220 may be internal or external to the reactor member 20. The insulating material 220 may partially or completely surround the circumference or outer surface of the reactor 10. The insulating material 220 is any material which is capable of imparting insulation at high temperatures equal to or greater than about 1700° C. and/or imparting low thermal conductivity insulation. In another embodiment, the insulating material 220 comprises two or more layers of the same or different insulating material.

The reactor member 20 also comprises an optional magnetic coil 230. In an embodiment, the magnetic coil 230 is affixed or disposed externally to or within at least part of the reactor member 20 or disposed externally to the reactor member 20. In another embodiment, the magnetic coil 230 is physically separate from the reactor member 20 and placed in a position external and adjacent to the reactor member 20. Affixing or disposing the insulating material 220 and magnetic coil 230 so as to form part of the reactor member 20 of the reactor 10 is desirable for commercial packaging and efficiency of use. The magnetic coil 230 is used to apply a magnetic field to the reactor member 20 and thereby magnetically stabilizes the reactor material 110 inside the plurality of absorber tubes 60 within the reactor member 20.

The absorber tubes may be manufactured from ultra-high temperature materials that can withstand temperatures of greater than 1500° C., preferably greater than 1600° C. and pressures of greater than 50 pounds per square inch (Psi), preferably greater than 100 psi. Ultra-high temperature materials include carbides, borides, nitrides, and oxides of early transition metals. Examples of ultra-high temperature materials hafnium diboride ($HfB_2$), zirconium diboride ($ZrB_2$), hafnium nitride (HfN), zirconium nitride (ZrN), titanium carbide (TiC), titanium nitride (TiN), thorium dioxide ($ThO2$), silicon carbide (SiC), tantalum carbide (TaC), or combinations thereof. Associated composites of the foregoing ultra-high temperature materials (e.g., with carbon, metal and glass fibers may also be used. In an exemplary embodiment, the absorber tubes may be manufactured from silicon carbide.

With reference again to the FIG. 1, the strontium carbonate acts as an energy absorbing medium and is packed within the solar reaction vessel. The decarbonation of strontium carbonate to produce strontium oxide and carbon dioxide is an endothermic reaction and it is facilitated by the absorption of solar energy. Since solar energy is available during the day, this reaction is conducted during the day. The carbon dioxide produced by the reaction is stored away for use in the second storage chamber 104 while the strontium oxide is stored in the first reaction chamber 103.

During times of power generation, the carbon dioxide stored in the second storage chamber 104 is the released from storage chamber back to the second reactor 105 (also called a high temperature receiver/reactor) where the reverse, exothermic reaction takes place and heat is transferred to the power block. This exothermic energy output will be captured by a heat transfer fluid and released to a high temperature (800 to 1200° C.) combined cycle power block. Power generation can continue during decomposition, as the heat transfer fluid can carry excess heat from the receiver/reactor to the power block. With a perfect combination of ideal temperature range and high degree of reversibility, this reaction has great potential for high overall thermal to electric conversion efficiency as a TCES system.

Put another way, when electricity is needed, carbon dioxide can then flow into the reactor and exothermically carbonate strontium oxide, forming strontium carbonate and releasing thermal energy at temperatures up to 1175° C. Temperatures of 800 to 1250° C. may be generated during the exotherm that occurs during the formation of strontium carbonate. This approach offers the potential of storing and releasing high temperature heat, which allows for very high efficiency power conversion when transferred to a working fluid (e.g., air or water) coupled with a power cycle (e.g. Combined Brayton/Rankine Cycle).

In one embodiment, metal oxide dopants such as a metal oxide, a ceramic, silicon dioxide, zirconium oxide, silicon oxide, calcium oxide, yttrium oxide, magnesium oxide, aluminum oxide, or a combination thereof may be added to the strontium carbonate to mitigate any sintering that may occur. These dopants may be added in amounts of 20 to 80, preferably 40 to 60 weight percent based on the total weight of the strontium carbonate.

In one embodiment, strontium zirconate is used in in combination with strontium carbonate as a supporting material in thermochemical energy storage systems. Solid state synthesis of strontium zirconate by heat-treating SrO and yttrium stabilized zirconia (YSZ) at high temperature is a simple, robust and reproducible method. Strontium zirconate is used in amounts of 20 to 80, preferably 40 to 60 weight percent based on the total weight of the strontium carbonate and strontium zirconate used in the reactor. In other words, the mass ratio of strontium carbonate to strontium zirconate is 2:8 to 8:2, preferably 4:6 to 6:4 and more preferably 4.8:5.2 to 5.2::4.8.

Carbon dioxide that is generated can be stored in sorbents for use when needed. The sorbents can be absorbents or adsorbents. Solid adsorbents and absorbents are attractive due to their high carbon dioxide absorption capacities and stability. Examples of sorbents include metal organic frameworks (MOFs), ionic liquids, activated carbon, eutectic solvents, or the like, or a combination thereof.

The systems and the compositions disclosed herein are exemplified by the following non-limiting examples.

EXAMPLE

Example 1

Figure 2:
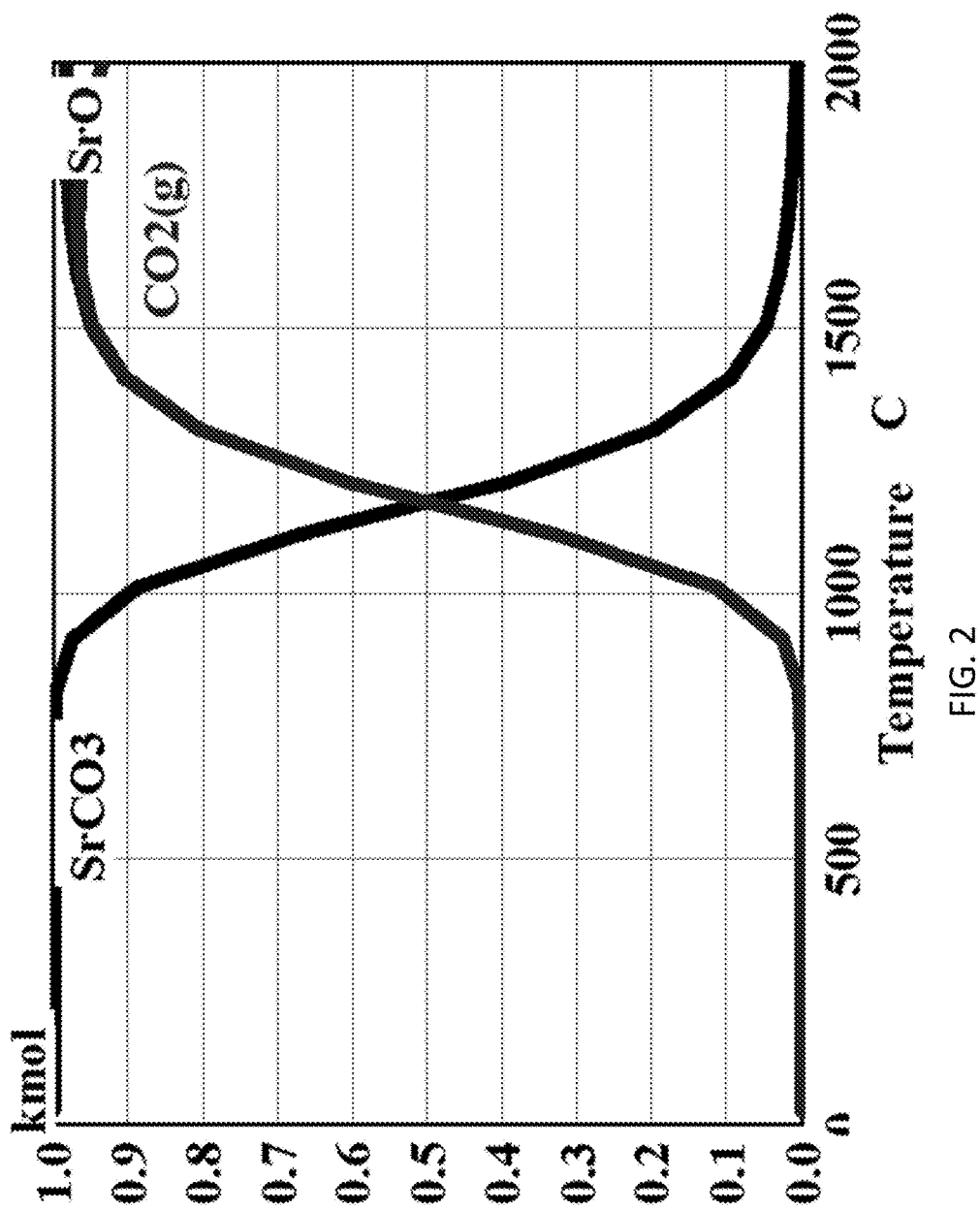
FIG. 2 is a graph that shows an equilibrium composition versus temperature for $SrCO_3 \leftrightarrow SrO + CO_2(g)$ at 1 bar.

The thermodynamics of the $SrCO_3/SrO/CO_2$ system are favorable in both directions within a convenient range of temperatures. FIG. 2 shows the variation of the equilibrium composition of the $SrCO_3/SrO/CO_2$ system at 1 bar for a basis of 1 mole $SrCO_3$ using HSC chemistry. It is important to note that this simulation was a Gibbs minimization of every possible compound formed by elements Sr, O, and/or C in the HSC database, as opposed to an exclusive reaction equilibrium. The thermodynamic significance of these simulation results is that there are no significant side reactions or products. Thermal reduction is shown to occur at temperatures attainable by central tower. The endothermic reaction has been readily studied experimentally and activation energies of 210 kJ/mol (under argon) and 569 kJ/mol (under $CO_2$) have been reported. The reaction kinetics and reversibility of the reaction show great promise to enable the development of a highly efficient and robust TCES system. The effective thermal conductivity of SrO and $SrCO_3$ in pellets of 28-33% porosity has been studied and found to be roughly 4.5-5.5 W/m/K in the temperature range of interest, which bodes well for rapid heat transfer within a particle bed.

Figure 3:
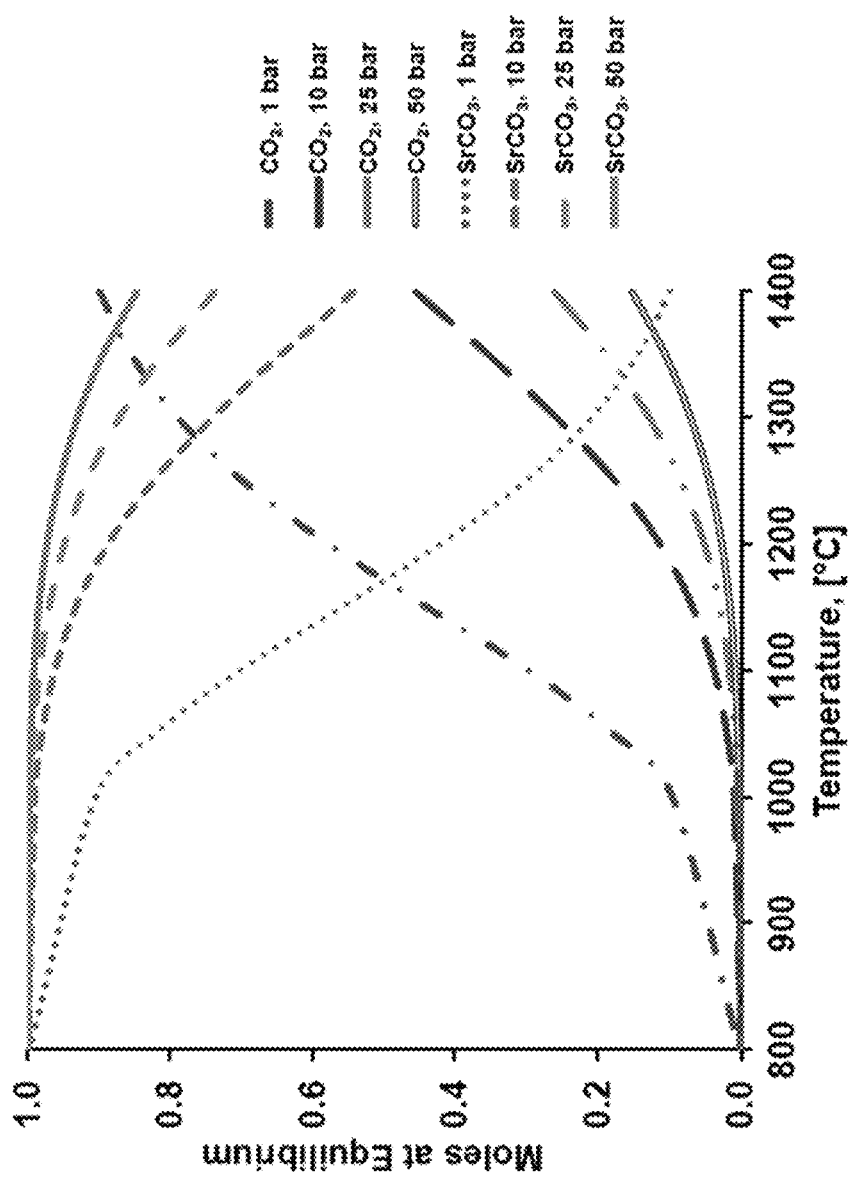
FIG. 3 is a graph showing equilibrium for a starting basis of 1 mole of $SrCO_3$ at 1, 10, 25, and 50 bar. Curves increasing with temperature correspond to both SrO and $CO_2$ and downward sloping curves represent $SrCO_3$.

The thermodynamics of the system are highly dependent on the partial pressure of $CO_2$, which, since $CO_2$ is the only gas in the system, is the total system pressure. As $CO_2$ is released from the high temperature decomposition reaction, it evolves and contributes to increasing the total system pressure. Pressure relief comes in the form of a $CO_2$ sink. At some point, the $CO_2$ source ($SrCO_3$ decomposition) and the $CO_2$ sink (low temperature storage) will reach an equilibrium pressure at which no flow of $CO_2$ will occur without a system disturbance. This disturbance is the cooling of the high temperature reactor during off-sun periods (periods when the sun goes down), which triggers the flow of $CO_2$ to reverse course and absorb on SrO to form $SrCO_3$. This flow reversal can be accelerated via addition of heat to the low temperature $CO_2$ storage matrix, which disturbs equilibrium. The decomposition reaction will become self-regulating as the total system pressure increases and comes into equilibrium. When power is needed, the bed temperature drops to roughly 1000 to 1100° C. and $CO_2$ is absorbed by the bed, causing a disturbance in equilibrium. To increase the rate at which $CO_2$ is absorbed and to decrease the volume of the storage chambers used, higher pressures will be beneficial. FIG. 3 shows that the decomposition reaction clearly can occur to a significant extent up to pressures of 10 bar. It is expected that tubes 60 (See FIGS. 12 and 13) the made of corrosion resistant, Saint Gobain Hexoloy® silicon carbide will be able to withstand these pressures, as the maximum rated temperature and pressure are 1650° C. and 168 bar, respectively.

Figure 4:
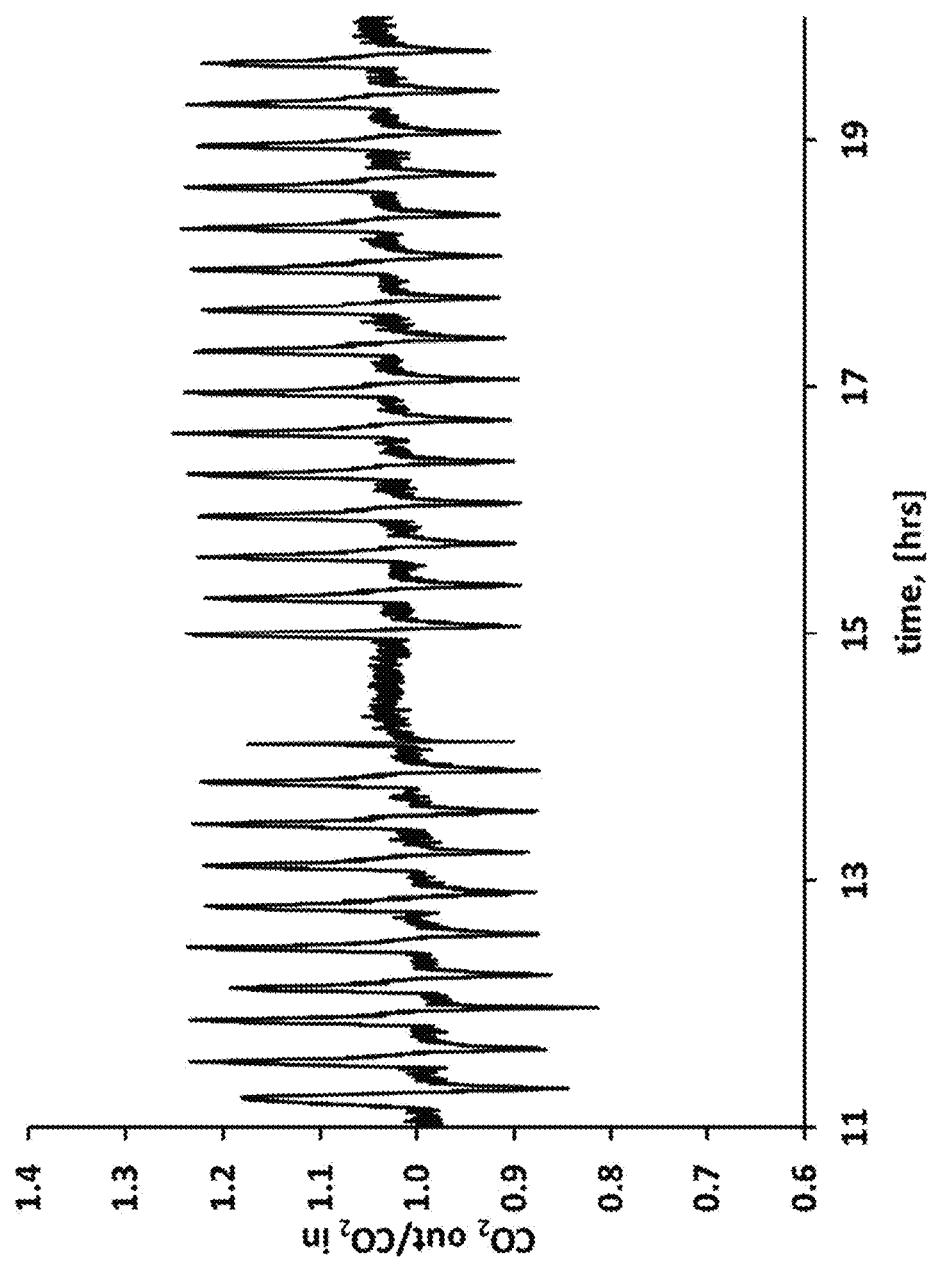
FIG. 4 depicts cycles 25-50, with temperature continuously cycled (i.e. no dwell time) between 1160 and 1290° C. at 13° C./min under an inlet stream of 83 mol % $CO_2$. The y-axis corresponds to the mole fraction of $CO_2$ in the outlet gas normalized to the inlet mole fraction. Note: Cycle 35 was influenced by furnace operation error.
Figure 5:
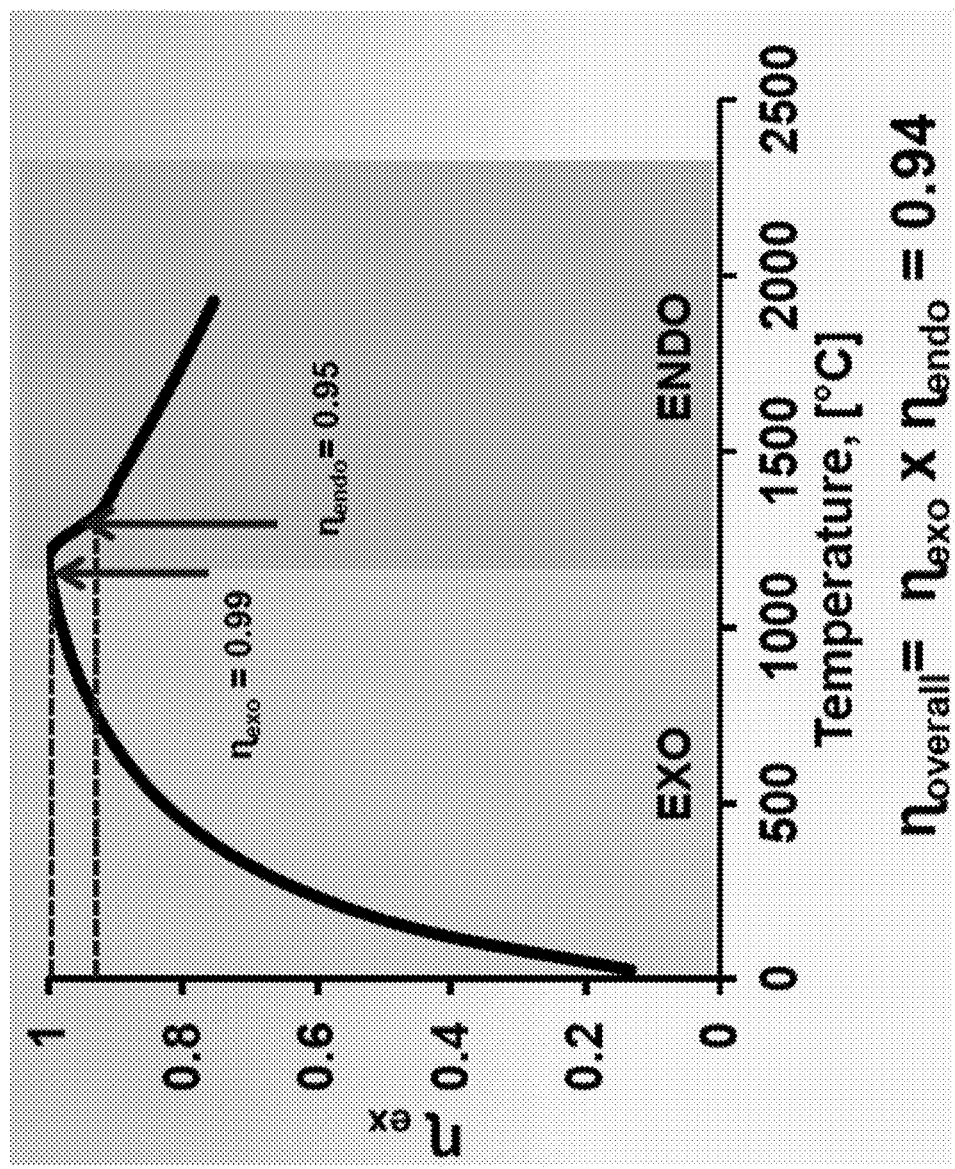
FIG. 5 shows the exergetic efficiency of $SrCO_3/SrO$ system.

Preliminary experiments have been conducted at the University of Florida using a fixed bed of $SrCO_3$ in a tubular reactor. Fifty consecutive cycles were carried out at atmospheric pressure under a background flow of $CO_2$, argon, and helium all of equal volumetric flowrates (see FIG. 4). Temperature of the tube furnace was cycled between 1160 and 1290° C. at a rate of 13° C. per minute. These temperatures correspond to high exergetic efficiency (i.e. >90%) for $SrO/SrCO_3$ system as shown in FIG. 5.

Figure 6:
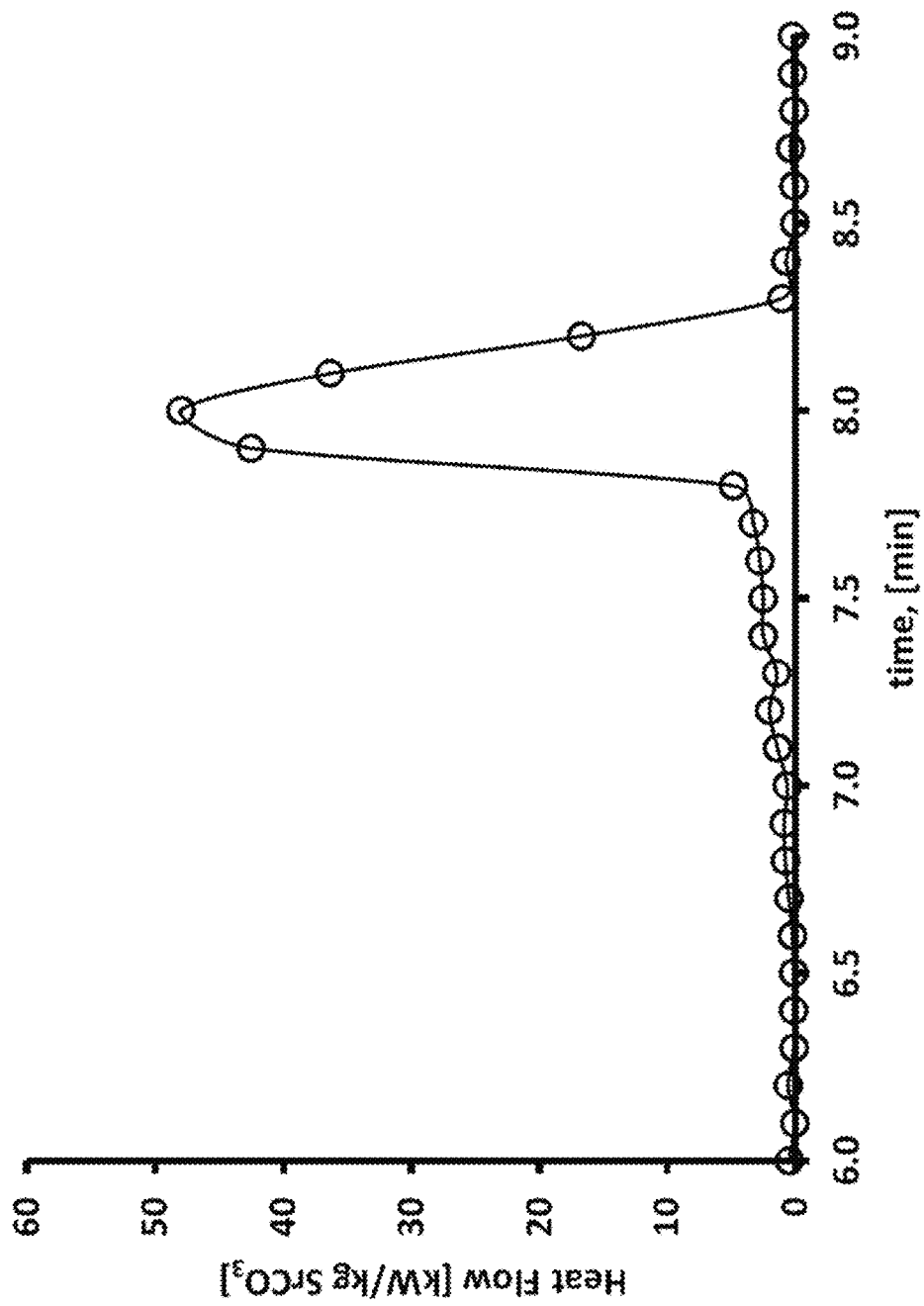
FIG. 6 shows the calculated heat release during the initial carbonation of SrO powder.

Of particular interest is the ability for the exothermic step to provide a sufficient ramp rate to the power block. FIG. 6 shows the initial cycle of the carbonation of SrO powder fresh from a commercial supplier. The calculated heat released based on the mass change as measured by thermogravimetry (TGA) corresponds to 40 kW/kg SrCO3, demonstrating a very high power density. During the 50 cycle test, approximately 0.2 kW/kg are repeatedly released, however the measurement resolution was not as high as during the TGA tests. For a 100 kW receiver/reactor designed to deliver 30 kW to a power block, 142 kg of active $SrCO_3$ is to be used (Note: here the mass of $SrCO_3$ is referenced since as the initial species loaded into the reactor, it would serve as a design reference point, although the mass of SrO—the species undergoing carbonation—is 30% less).

Figure 7B:
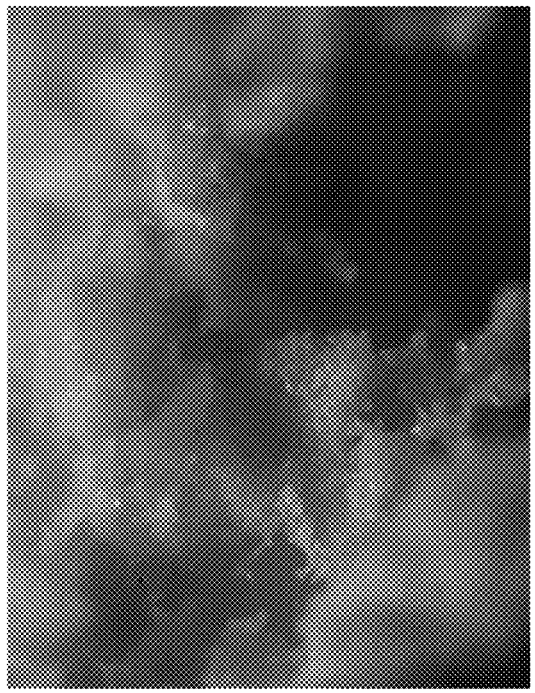
FIG. 7B also shows images of porous $SrO/SrCO_3$ structure synthesized by sacrificial pore formation using graphite particles.
Figure 7A:
FIG. 7A shows images of porous $SrO/SrCO_3$ structure synthesized by sacrificial pore formation using graphite particles.

Although the decomposition kinetics are faster than the carbonation kinetics, it should be noted that increasing the system pressure (and $CO_2$ concentration) would likely increase the thermodynamic and kinetic driving force for carbonation, greatly enhancing the carbonation reaction rate. In this experiment the forward and backward kinetics are of the same order of magnitude. A useful feature of the 50 cycle study is that the activity stabilizes after using a porous $SrCO_3$ matrix created using sacrificial pore formation with graphite (see structure in FIG. 7) The strontium carbonate is left over after graphite is burned out sacrificially.

The data shows the superior thermal stability of $SrCO_3$ relative to other Group 2 carbonates. These results give strong credence to the concept of $CO_2$ shuttling and points towards $SrO/SrCO_3$ as a promising reaction for TCES.

Example 2

Figure 8:
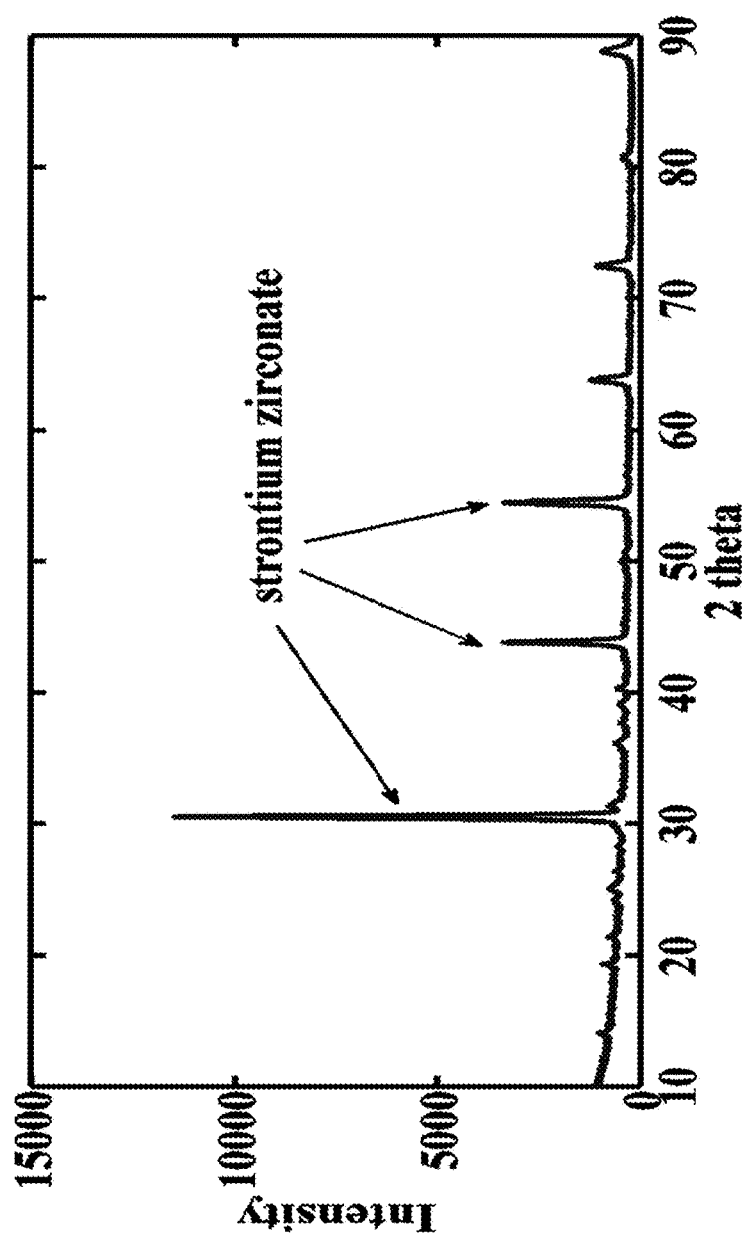
FIG. 8 shows an xray diffraction plot of strontium zirconate sample synthesized by solid state reaction of SrO and YSZ.

Strontium oxide (Alfa Aesar) and 8 mole percent (mol %) yttria stabilized zirconia (YSZ) (99.9%, Advanced Materials) are well-mixed in 1:1 molar ratio. The mixture is heat-treated in a muffle furnace at 1500° C. for 8 hours under air. During this process, strontium zirconate is synthesized via solid state reaction between strontium oxide and YSZ. Xray diffraction (XRD) analysis of the sample confirms formation of the strontium zirconate ($SrZrO_3$) (See FIG. 8). Strontium zirconate is stable under operating conditions observed for $SrO/SrCO_3$ looping cycle and can be used as a supporting material to inhibit sintering of reactive particles and retain the active surface area. Powder of strontium zirconate is sieved to prepare samples in different particle size ranges: 25-38 µm (micrometers), 38-63 µm, 63-106 µm, and 106-125 µm.

Strontium Hydroxide (Reactive Material):

Strontium oxide is highly hygroscopic in nature and transforms into strontium hydroxide by absorbing moisture from air. It is difficult to protect SrO from the moisture during synthesis process and some amount of SrO is likely to form $Sr(OH)_2$. Thus, a starting material for the experimental investigation is a mixture of SrO and $Sr(OH)_2$. To avoid this ambiguity, stable strontium hydroxide is chosen as a starting material. During preheating process, $Sr(OH)_2$ loses moisture to recover SrO. Strontium oxide is heat-treated at similar conditions described earlier in this section for synthesis of strontium zirconate. Sintered structure of strontium oxide is exposed to air at room temperature for 72 hours, during which SrO absorbed moisture from air to form strontium hydroxide $Sr(OH)_2$. Strontium hydroxide powder is sieved to prepare samples in different particle size ranges: 25-38 µm, 38-63 µm, 63-106 µm, and 106-125 µm.

Mass Ratio of Supporting Material to Reactive Material:

The mass ratio of strontium zirconate must be optimized to: a) inhibit sintering of the reactive particles, and b) maximize the mass of reactive material to achieve higher energy density. It was proposed that, equal number of reactive particles and supporting particles are necessary to inhibit sintering. This hypothesis is used as a basis to determine the mass ratio of supporting material to reactive material. Detail mathematical analysis is as follows.

Assumptions:
1. All the particles have a spherical shape.
2. The particles themselves do not have any porosity.

Nomenclature:
$M_R$=mass of reactive material (strontium hydroxide)
$M_S$=mass of supporting material (strontium zirconate)
$\rho_R$=density of strontium hydroxide (3.62 g/cm$^3$)
$\rho_S$=density of strontium zirconate (5.46 g/cm$^3$)
$\gamma$=mass ratio $$\left(\frac{M_R}{M_S}\right)$$

N=number of particles
V=volume of single particle $$\gamma = \frac{M_R}{M_S} = \frac{NV\rho_R}{NV\rho_S} = \frac{5.46}{3.62} \approx 1.50$$

The mathematical analysis indicates that, the mass of supporting material should be 1.5 times the reactive material. However, this is the first approximation and mass ratio will be optimized further based on the experimental analysis.

Figure 9:
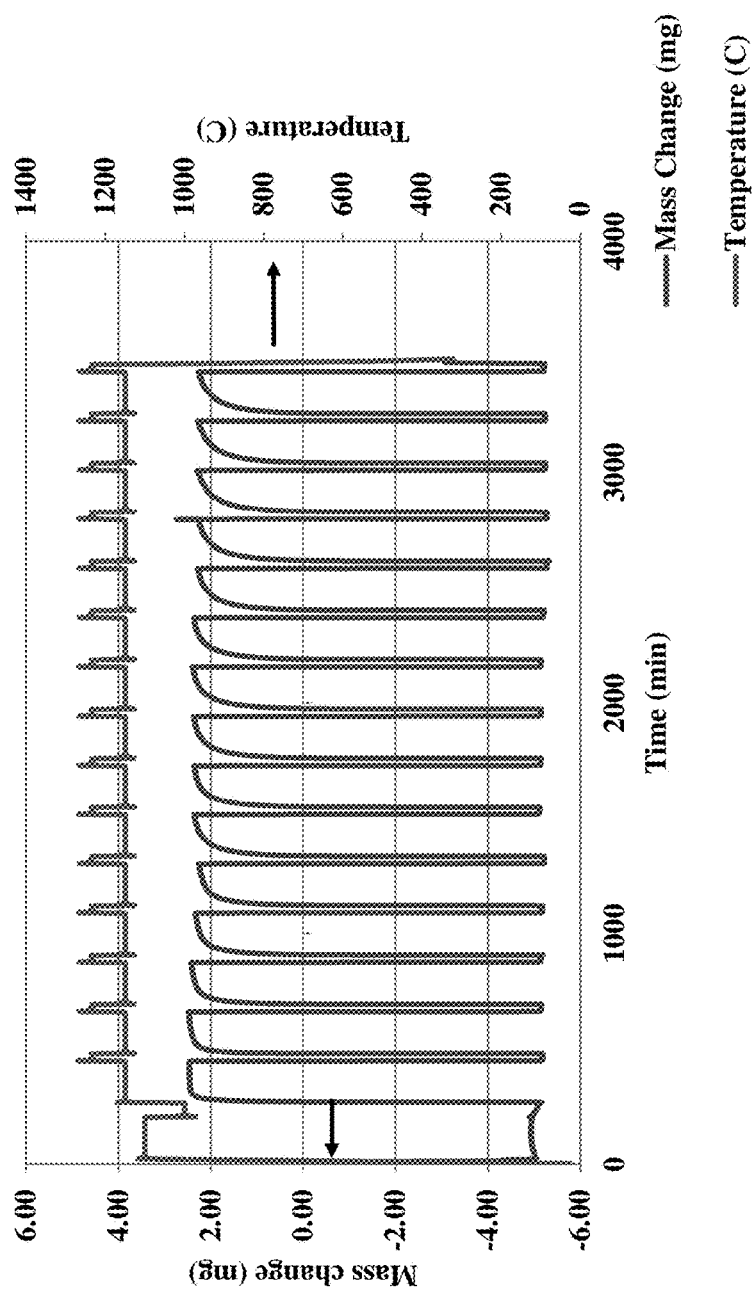
FIG. 9 shows mass change during carbonation/de-carbonation of SrYSZ supported $SrO/SrCO_3$ reactive sample cycled between 1150° C. (carbonation for 3 hrs.) and 1235° C. (de-carbonation for 30 minutes) for 15 consecutive cycles.

Preliminary experiments are conducted to examine the repeatability of the $SrO/SrCO_3$ carbonation/de-carbonation cycle using strontium zirconate (SrYSZ) as a support material. Powder samples of SrYSZ (38-63µ) and $Sr(OH)_2$ (38-63µ) are mixed in 3:2 mass ratio and reactive sample is cycled between 1150° C. (carbonation for 3 hours) and 1235° C. (de-carbonation for 30 minutes) with thermogravimetric analysis (TGA) using a Netzsch STA 449 F3 Jupiter TG for 15 consecutive cycles; results are summarized in FIG. 9. It is observed that, the extent of carbonation and de-carbonation is repeatable over consecutive looping cycles which confirms SrYSZ supported $SrO/SrCO_3$ reactive sample is stable under these operating conditions. Similar procedure is followed to synthesize various supporting materials including strontium aluminate ($SrAl_2O_4$), and strontium titanate ($SrTiO_3$). Experimental investigation indicates that strontium aluminate ($SrAl_2O_4$) and strontium titanate ($SrTiO_3$) perform poorly as a support material. The energy density of $SrO/SrCO_3$ system with these support materials is less than half (less than 650 MJ/m$^3$) compared to SrYSZ supported $SrO/SrCO_3$ reactive sample (~1450 MJ/m$^3$). Performance of commercial $SrZrO_3$ is also investigated as a support material. Although, its performance is comparable to SrYSZ, the energy density with SrYSZ is considerably higher. It is evident that strontium zirconate (SrYSZ) serves as an excellent support material for $SrO/SrCO_3$ reactive particles and inhibits sintering.

Figure 10:
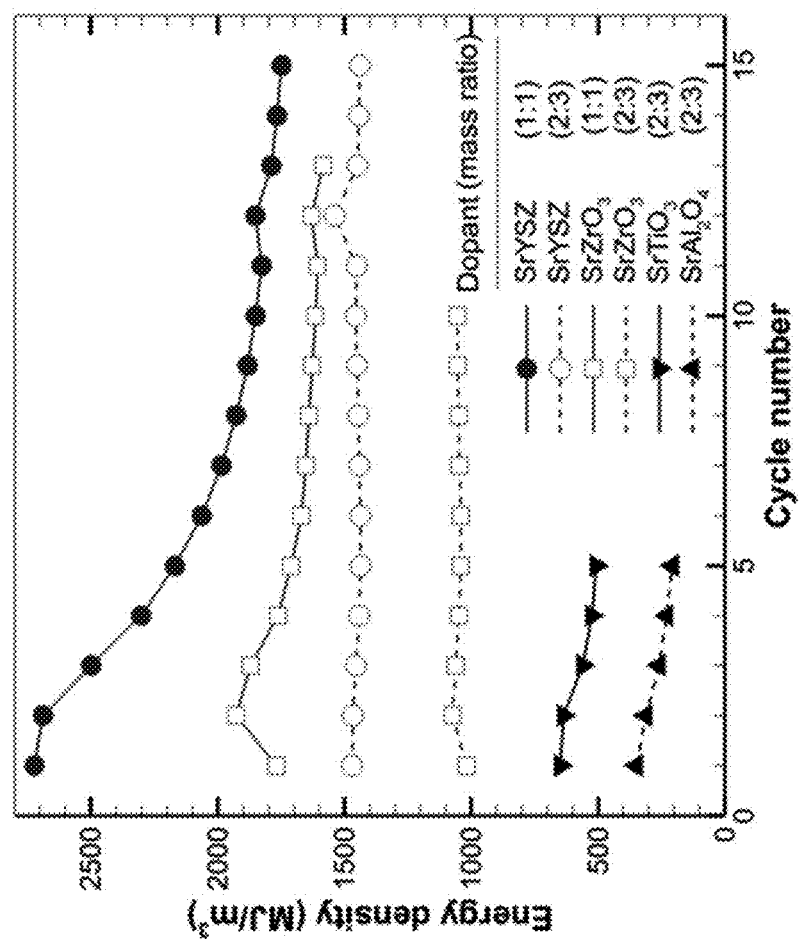
FIG. 10 shows energy density of $SrO/SrCO_3$ system using various support materials for consecutive looping cycles. (The mass ratio is defined as the ratio of the mass of $Sr(OH)_2$ to that of the supporting material)

In summary, an attempt is made to optimize the mass content of SrYSZ in the reactive mixture to increase the energy density. Reactive sample with equal mass content of $Sr(OH)_2$ and SrYSZ provides higher energy density, however it is not as stable as $Sr(OH)_2$:SrYSZ=2:3 sample. Energy density calculated for $SrO/SrCO_3$ sample supported by different materials is summarized in the FIG. 10. The FIG. 10 shows the density of $SrO/SrCO_3$ system using various support materials for consecutive looping cycles. (The mass ratio is defined as the ratio of the mass of $Sr(OH)_2$ to that of the supporting material).

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Therefore, it is intended that this disclosure not be limited to the particular embodiment disclosed as the best mode contemplated for carrying out this disclosure.

What is claimed is:

1. A method comprising:
   heating a strontium-containing compound using radiation or waste heat in a first reactor;
   decomposing the strontium-containing compound into an oxide and carbon dioxide as a result of heat generated by the exposure to the radiation or waste heat;
   reacting the oxide and the carbon dioxide in a second reactor; where the oxide and carbon dioxide react to produce heat;
   heating a working fluid using the heat produced in the second reactor; and
   generating energy using the heated working fluid.

2. The method of claim 1, where the radiation is solar radiation.

3. The method of claim 1, where the radiation is visible and/or infrared radiation.

4. The method of claim 1, further comprising discharging the oxide and carbon dioxide to separate storage chambers prior to charging the oxide and the carbon dioxide to the second reactor.

5. The method of claim 1, where a temperature in the second reactor is 800 to 2000° C.

6. The method of claim 1, where the working fluid is water.

7. The method of claim 1, where the working fluid is air.

8. The method of claim 1, further comprising transporting the heated working fluid to a turbine in communication with a generator, the energy being generated via the turbine and the generator.

9. The method of claim 8, where the turbine and generator are operated using a Brayton-Rankine cycle.

10. The method of claim 1, where the strontium-containing compound is strontium carbonate.

11. The method of claim 1, where the strontium-containing compound is a mixture of strontium carbonate and strontium zirconate.

12. The method of claim 11, where the mixture of strontium carbonate and strontium zirconate are present in a mass ratio of 2:8 to 8:2.

13. The method of claim 1, where the first and the second reactor are parts of a single reactor.

14. The method of claim 1, where the working fluid is carbon dioxide or supercritical carbon dioxide.

15. A system comprising:
   a first reactor in fluid communication with a second reactor; where the first reactor contains a strontium-containing compound; and wherein the system is operative to:
   heat the strontium-containing compound using radiation or waste heat in the first reactor;
   decompose the strontium-containing compound into an oxide and carbon dioxide as a result of heat generated by the exposure to the radiation or the waste heat;
   react the oxide and the carbon dioxide in the second reactor; where the oxide and carbon dioxide react to produce heat;
   heat a working fluid using the heat produced in the second reactor; and
   generate energy with the heated working fluid.

16. The system of claim 15, where the system is in fluid communication with a sorbent chamber that stores the carbon dioxide generated in the first reactor.

\* \* \* \* \*